United States Patent
Turner

(10) Patent No.: US 7,219,579 B2
(45) Date of Patent: May 22, 2007

(54) APPARATUS AND METHOD FOR ACTUATING CONTROL SURFACES

(75) Inventor: Mark A. Turner, Arlington, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 301 days.

(21) Appl. No.: 10/797,489

(22) Filed: Mar. 10, 2004

(65) Prior Publication Data
US 2005/0224632 A1    Oct. 13, 2005

(51) Int. Cl.
*F16H 37/06* (2006.01)
(52) U.S. Cl. ............. 74/665 N; 74/640; 74/665 Q; 74/665 P; 74/414; 74/421 A; 74/424.71; 244/3.21; 244/3.24
(58) Field of Classification Search ............ 74/640, 74/665 L, 665 N, 665 Q, 665 P, 413, 41.4, 74/414, 421 A, 424.71; 244/3.21, 3.24
See application file for complete search history.

(56) References Cited

U.S. PATENT DOCUMENTS

| | | | | |
|---|---|---|---|---|
| 4,272,040 A | * | 6/1981 | Bastian et al. ............. 244/3.22 |
| 4,679,485 A | * | 7/1987 | Nelson et al. ............. 89/36.02 |
| 4,738,415 A | * | 4/1988 | Weyer ........................ 244/99.5 |
| 4,745,815 A | * | 5/1988 | Klopfenstein ............... 74/89.25 |
| 4,979,700 A | * | 12/1990 | Tiedeman et al. ......... 244/99.2 |
| 5,058,445 A | * | 10/1991 | Nilsson ...................... 74/89.4 |
| 5,813,292 A | * | 9/1998 | Kish et al. ................. 74/665 C |
| 6,247,666 B1 | * | 6/2001 | Baker et al. ............... 244/3.21 |
| 6,474,594 B1 | * | 11/2002 | Johnson et al. ............ 244/3.24 |
| 6,637,699 B2 | * | 10/2003 | Banks et al. ............... 244/3.21 |

\* cited by examiner

*Primary Examiner*—David D. Le
(74) *Attorney, Agent, or Firm*—Daren C. Davis; James E. Walton

(57) ABSTRACT

An apparatus for actuating a control surface includes a first spur gear, a first drive assembly engaged with the first spur gear, a second spur gear, a second drive assembly engaged with the second spur gear, and a gear assembly capable of being coupled with the control surface and engaged with the spur gears. The gear assembly includes a first screw, a first gear engaged with the first spur gear, a thrust nut mounted to the first gear and threadedly engaged with the first screw, a second gear engaged with the second spur gear, a second screw mounted to the second gear and mechanically coupled with the thrust nut and a translation nut threadedly engaged with the second screw and capable of being coupled with the control surface. The second screw and the thrust nut rotate independently and translations of the thrust nut are transmitted to the second screw.

27 Claims, 8 Drawing Sheets

APPARATUS AND METHOD FOR ACTUATING CONTROL SURFACES

BACKGROUND OF THE INVENTION

1. Field of the Invention

The present invention is directed to directional and attitudinal control for an airbore or sea-going vehicle and, in particular, an apparatus and method for actuating control surfaces of such vehicles.

2. Description of the Related Art

Airborne or water borne vehicles are often used to deliver a payload to a target location or to carry a payload over a desired area. For example, projectiles may be used in combat situations to deliver a payload, such as an explosive warhead or a kinetic energy penetrator to a target to disable or destroy the target. Surveillance vehicles may carry a payload designed to sense certain conditions surrounding the vehicle, such as objects on the ground or weather activity. Such vehicles typically include a plurality of control surfaces, such as fins, canards, flares, etc., that are articulated to control the vehicle's direction and attitude.

In many conventional vehicles, a separate actuation apparatus (e.g., a motor and a power transmission system) is provided for each of the control surfaces. For example, if a projectile includes four fins, four separate motor and power transmission assemblies would be provided. In such vehicles, one or more computers determine the desired orientation (i.e., pitch, yaw, and roll) of the vehicle depending upon its destination, obstacles in its path, and other factors. The computer or computers then calculate the required orientation of the control surfaces to attain the desired vehicle orientation and command each of the actuation apparatuses separately to orient the control surfaces accordingly.

It is generally desirable, however, for such vehicles to be lighter in weight, rather than heavier, so that their ranges may be extended while using an equivalent amount of propellant. Further, it is generally desirable for the contents of the vehicle other than the payload, e.g., the motors, power transmission assemblies, and the like, to be more compact, so that larger payloads may be used within the body of the projectile. It is also often desirable to decrease the complexity of calculating the required orientation of the control surfaces to attain the desired vehicle orientation and commanding the actuation apparatuses to orient the control surfaces accordingly.

The present invention is directed to overcoming, or at least reducing, the effects of one or more of the problems set forth above.

SUMMARY OF THE INVENTION

In one aspect, the present invention provides an apparatus for actuating a control surface. The apparatus includes:
  a first spur gear;
  a first drive assembly engaged with the first spur gear;
  a second spur gear;
  a second drive assembly engaged with the second spur gear; and
  a gear assembly mechanically capable of being coupled with the control surface and engaged with the spur gears.

In another aspect of the present invention, a vehicle is provided. The vehicle includes:
  a control surface; and
  an apparatus for actuating the control surface, comprising:
    a first spur gear;
    a first drive assembly engaged with the first spur gear;
    a second spur gear;
    a second drive assembly engaged with the second spur gear; and
    a gear assembly mechanically coupled with the control surface and engaged with the spur gears.

In yet another aspect, the present invention provides a method for actuating a control surface, comprising actuating the control surface in response to an actuation of at least one of a first spur gear and a second spur gear.

In another aspect, the present invention provides a method for actuating a control surface including mechanically combining two inputs into a single mechanical output to the control surface.

In yet another aspect, the present invention provides an apparatus for actuating a control surface including means for mechanically combining two inputs into a single mechanical output to the control surface.

BRIEF DESCRIPTION OF THE DRAWINGS

The invention may be understood by reference to the following description taken in conjunction with the accompanying drawings, in which like reference numerals identify like elements, and in which.

Figure 1:
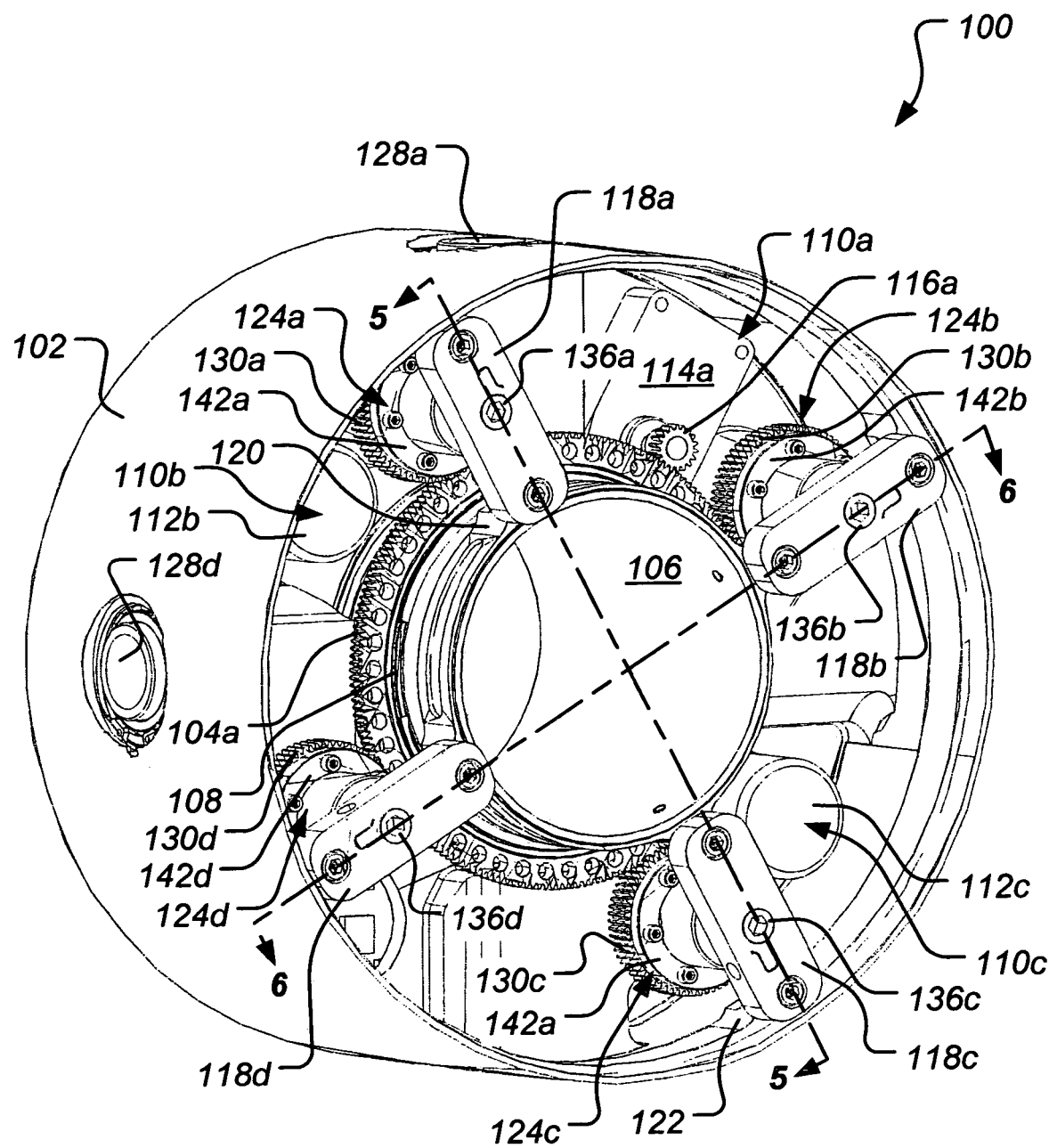
FIG. 1 is a front, perspective view of the an actuation apparatus according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention relates to an apparatus and method for actuating control surfaces (e.g., fins, canards, flaps, tabs, etc.) of an airborne or sea-going vehicle. In particular, the present invention provides an apparatus for actuating a number of control surfaces with a lesser number of drive motors. For example, one embodiment of the present invention comprises an apparatus for actuating four control surfaces with only three drive motors, corresponding to roll, pitch, and yaw. Alternatively, the apparatus may be adapted to control four control surfaces with only two drive motors, corresponding to, for example, pitch and yaw.

Figure 2:
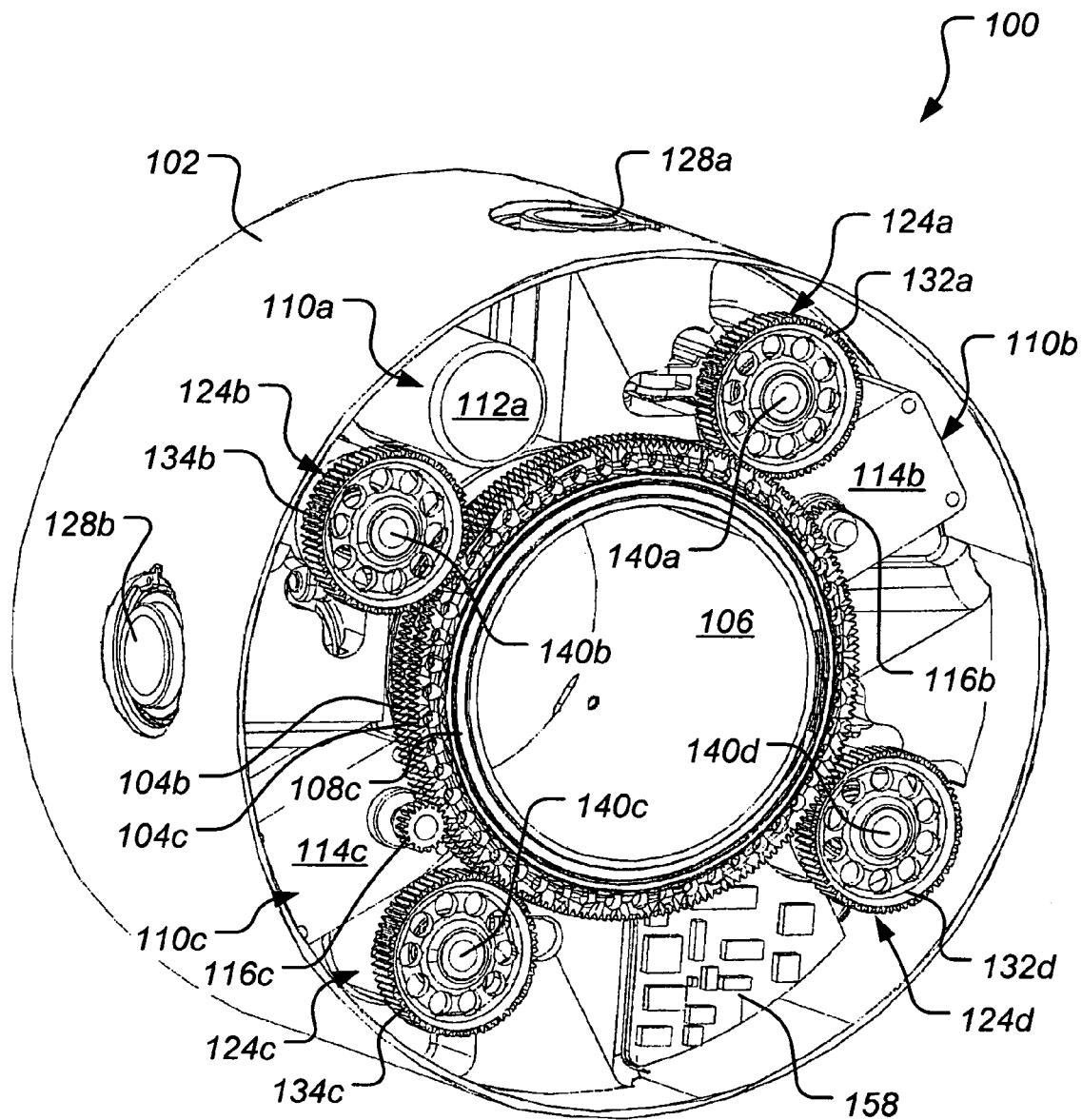
FIG. 2 is a rear, perspective view of the actuation apparatus of FIG. 1.
Figure 3:
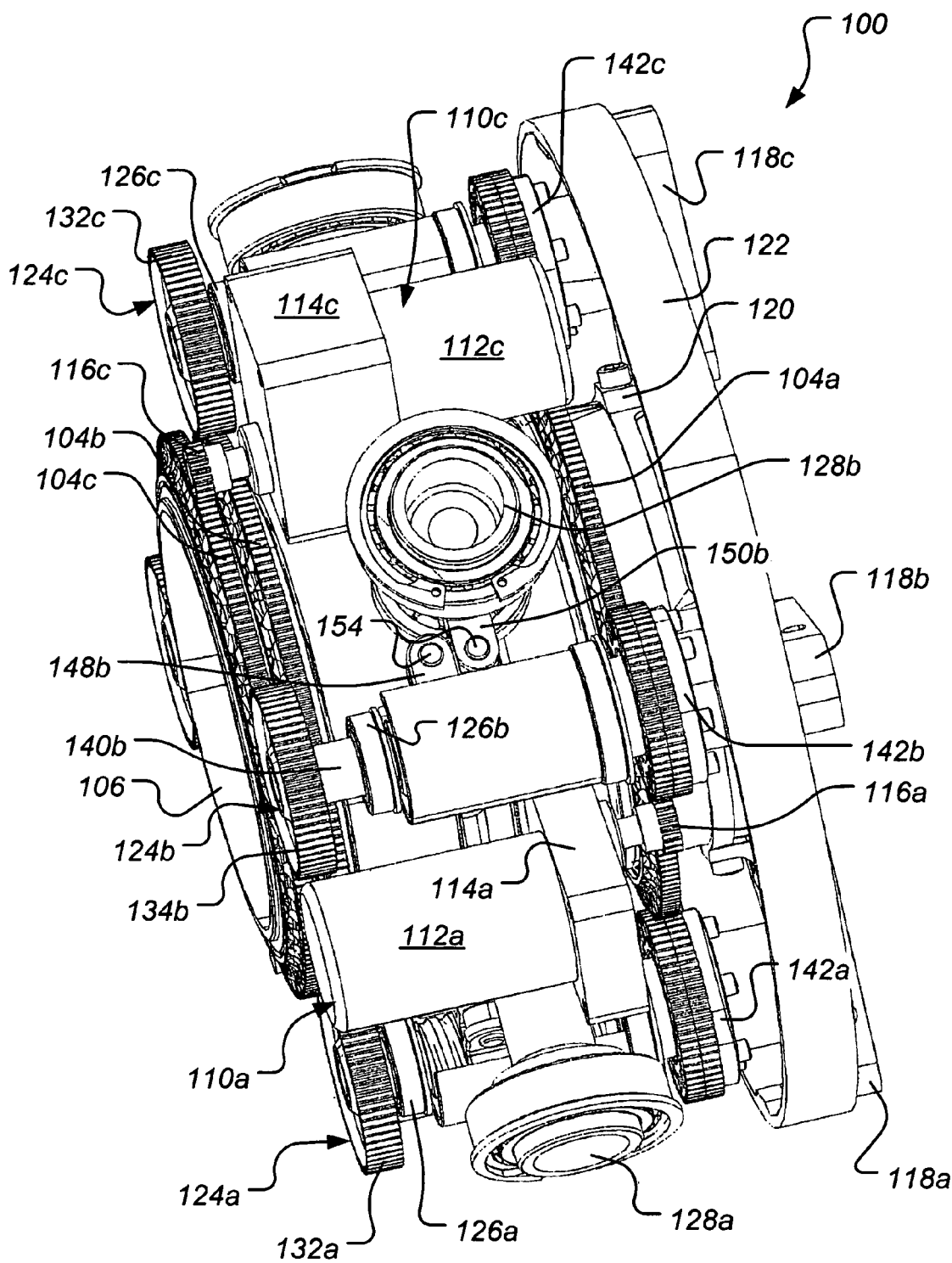
FIG. 3–FIG. 4 are side, perspective views of the actuation apparatus of FIG. 1 in which a housing has been removed to better illustrate the invention.
Figure 4:
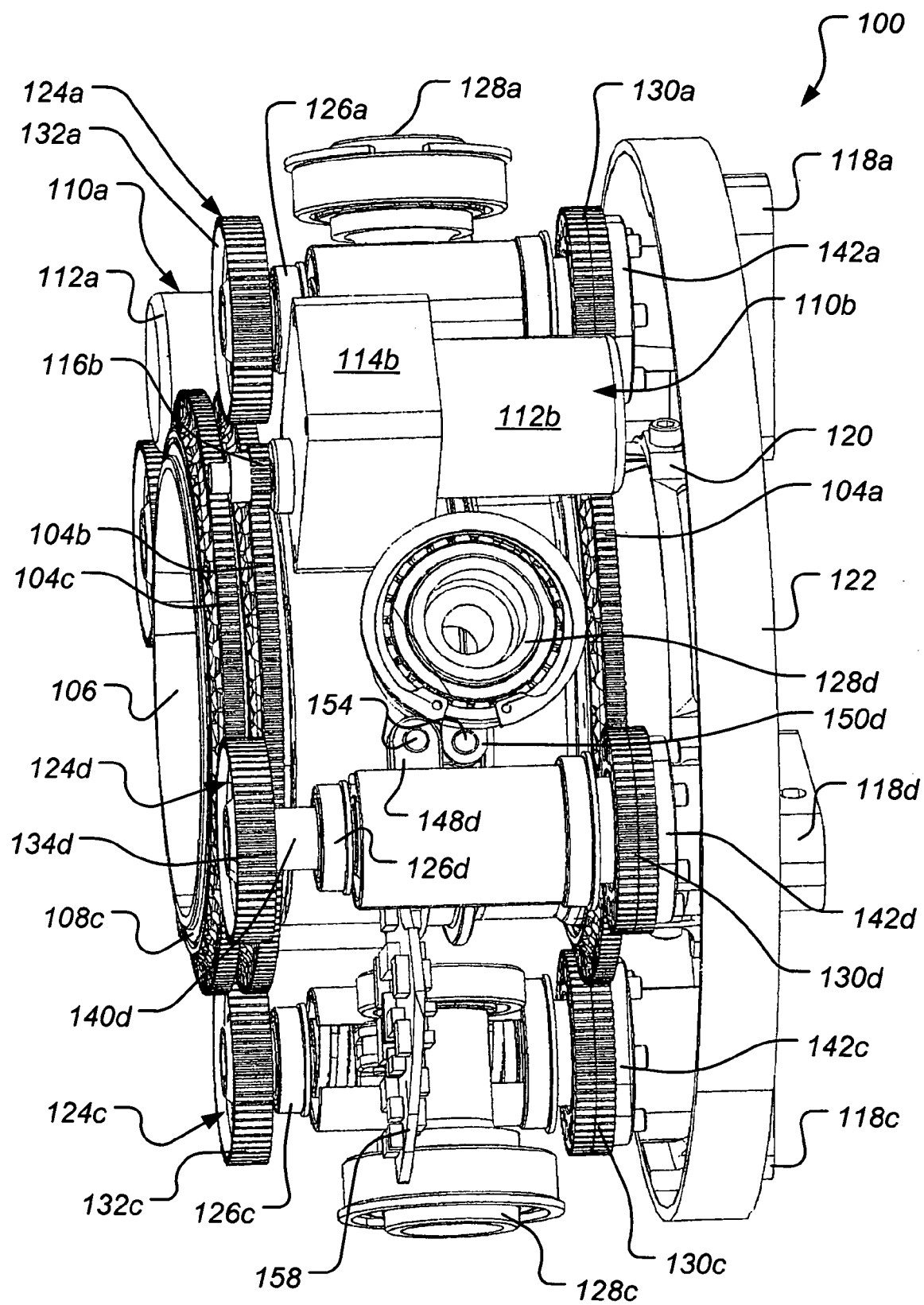
Figure 5:
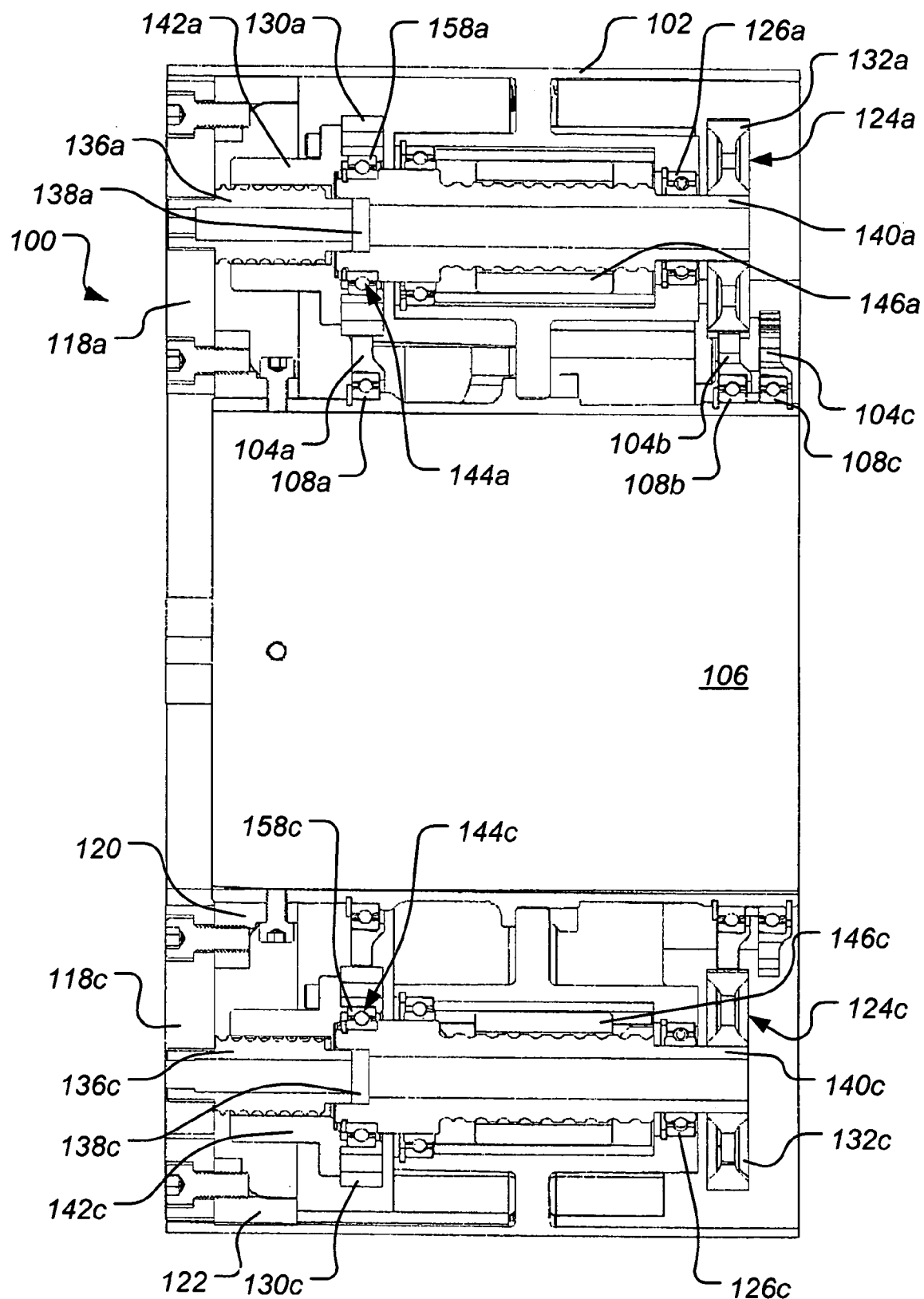
FIG. 5 is a cross-sectional view of the actuation apparatus of FIG. 1 taken along line 5—5 of FIG. 1.
Figure 6:
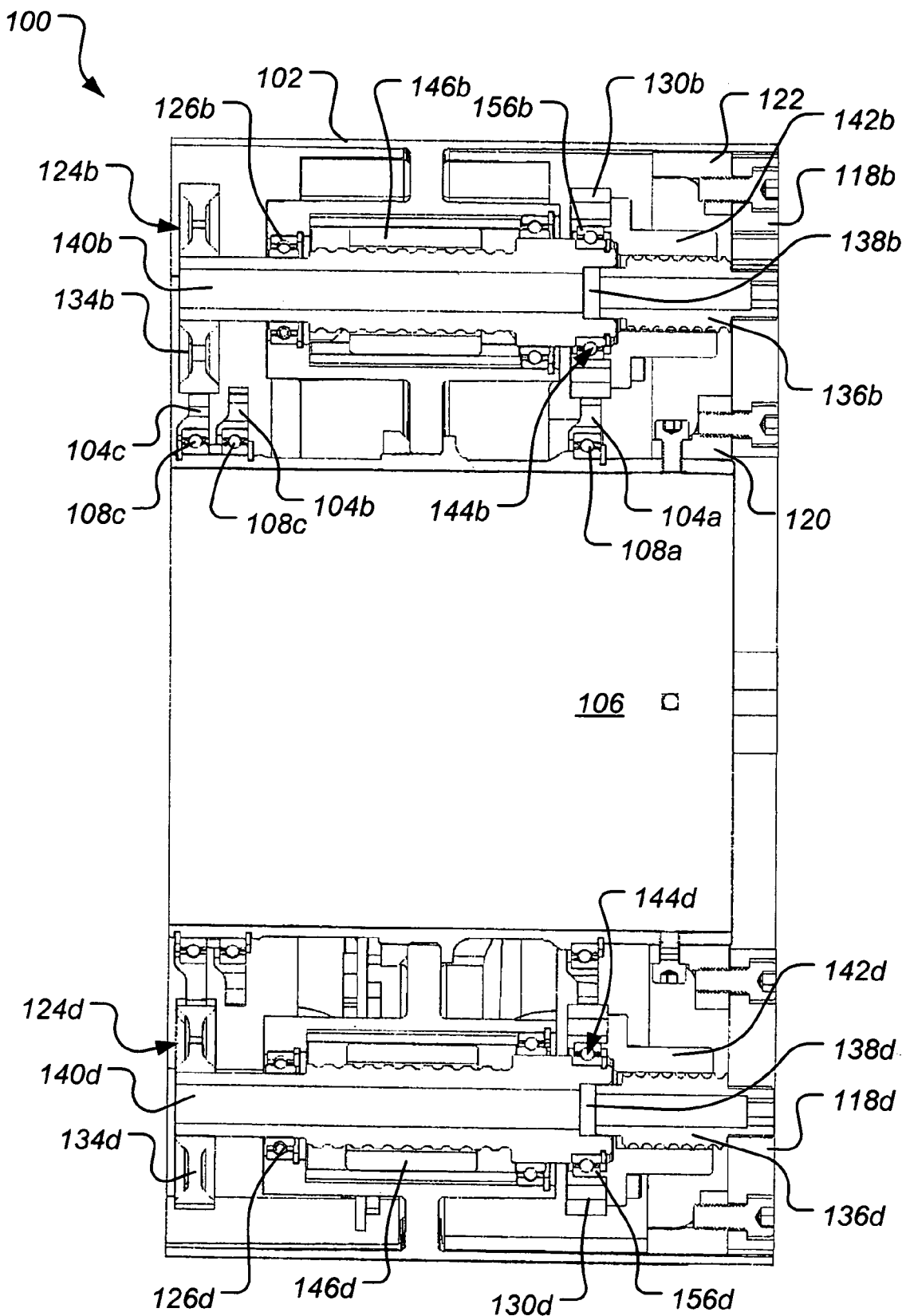
FIG. 6 is a cross sectional view of the actuation apparatus of FIG. 1 taken along line 6—6 of FIG. 1.
Figure 7:
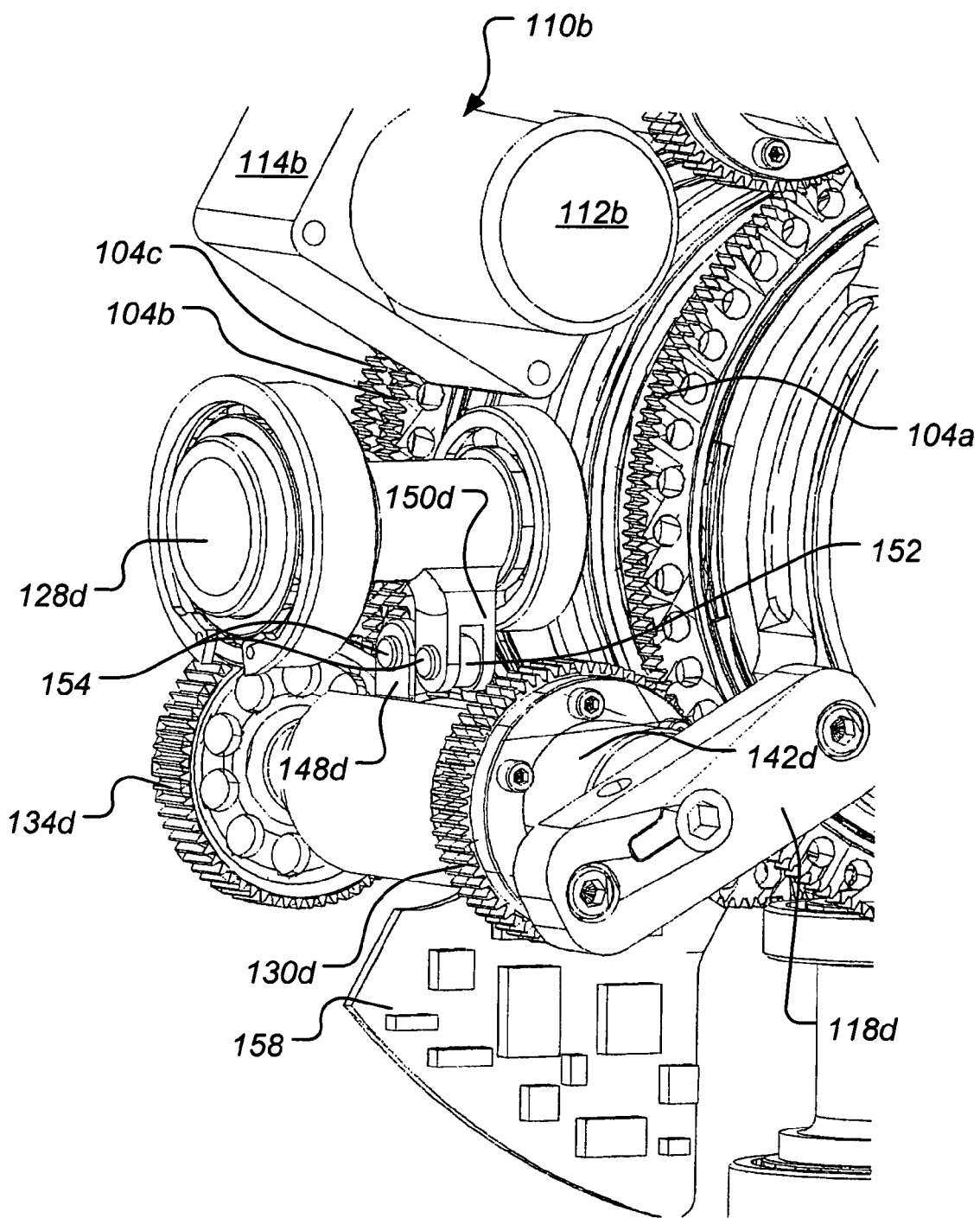
FIG. 7 is an enlarged, perspective view of a portion of the actuation apparatus of FIG. 1 in which some elements of the apparatus have been removed to better illustrate the invention.

FIG. 1–FIG. 7 illustrate various views of an embodiment of a control surface actuation apparatus 100 according to the present invention. FIG. 1 is a front, perspective view of the actuation apparatus 100, while FIG. 2 is a rear, perspective view of the actuation apparatus 100. FIG. 3–FIG. 4 are side, perspective views of the actuation apparatus 100 in which a housing 102 (shown in FIG. 1–FIG. 2) has been removed to better illustrate the invention. FIG. 5 is a cross-sectional view of the actuation apparatus 100 taken along line 5—5 of FIG. 1. FIG. 6 is a cross sectional view of the actuation apparatus 100 taken along line 6—6 of FIG. 1. FIG. 7 is an enlarged, perspective view of a portion of the actuation apparatus 100.

The actuation apparatus 100 includes a roll spur gear 104a (not shown in FIG. 2), a pitch spur gear 104b (not shown in FIG. 1) and a yaw spur gear 104c (also not shown in FIG. 1). The spur gears 104a–104c are mounted to a central tube 106 by bearings 108a–108c, respectively (shown best in FIG. 5–FIG. 6), which allow the spur gears 104a–104c to rotate with respect to the central tube 106.

Mounted to the housing 102 are a roll drive assembly 110a (best shown in FIG. 4), a pitch drive assembly 110b (best shown in FIG. 3) and a yaw drive assembly 110c (best shown in FIG. 4). In the illustrated embodiment, each of the drive assemblies 110a–110c include a motor 112a–112c, respectively, coupled with a speed reducer 114a–114c, respectively. Each of the drive assemblies 110a–110c includes a drive gear 116a–116c, respectively, that is engaged with its corresponding spur gear 104a–104c. For example, the drive gear 116a of the roll drive assembly 110a is engaged with the roll spur gear 104a and, when driven, the drive gear 116a rotates the roll spur gear 104a with respect to the central tube 106. Other configurations of the drive assemblies 110a–110c, however, may be used to drive the spur gears 104a–104c.

A plurality of thrust bars 118a–118d (not shown in FIG. 2) is mounted to the central tube 106 by an inner thrust bar ring 120 and is mounted to the housing 102 by an outer thrust bar ring 122 (best shown in FIG. 5). Each of the thrust bars 118a–118d supports one end of a gear assembly 124a–124d, as will be more fully discussed later. The gear assemblies 124a–124d are also supported by the housing 102 via bearings 126a–126d (best shown in FIG. 3–FIG. 6), respectively.

Each of the gear assemblies 124a–124d is mechanically coupled with one of a plurality of output shafts 128a–128d, respectively, which are, in turn, mechanically coupled, as will be described more fully below, with a corresponding plurality of control surfaces 804 (shown in FIG. 8) for actuating the control surfaces 804. Note that in the description that follows, the elements comprising the gear assemblies 124a–124c, are identified by a suffix letter (e.g., 128a, 132c, etc.) indicating to which gear assembly they belong. For example, an element of the gear assemblies 124a–124d that is identified by the suffix "b" (e.g., 128b) is an element of the gear assembly 124b.

Referring in particular to FIG. 3–FIG. 4, each of the gear assemblies 124a–124d comprises a roll gear 130a–130d engaged with the roll spur gear 104a. The roll drive assembly 110a actuates the roll spur gear 104a and, in turn, the roll spur gear 104a actuates the roll gears 130a–130d. Each of the gear assemblies 124a, 124c further comprises a pitch gear 132a, 132c engaged with the pitch spur gear 104b, such that the pitch drive assembly 110b actuates the pitch spur gear 104b that, in turn, actuates the pitch gears 132a, 132c. Each of the gear assemblies 124b, 124d further comprises a yaw gear 134b, 134d engaged with the yaw spur gear 104c, such that the yaw drive assembly 110c actuates the yaw spur gear 104c that, in turn, actuates the yaw gears 134b, 134d. Thus, in the illustrated embodiment, all of the gear assemblies 124a–124d are used to control the roll of the vehicle, while only the gear assemblies 124a, 124c are used to control the pitch of the vehicle and only the gear assemblies 124b, 124d are used to control the yaw of the vehicle. Alternatively, the gear assemblies 124a, 124c may used to control the yaw of the vehicle and the gear assemblies 124b, 124d may be used to control the pitch of the vehicle.

FIG. 5 provides a cross-sectional view of the actuation apparatus 100 taken along the 5—5 line in FIG. 1, illustrating one particular construction of the gear assemblies 124a, 124c, which are used in the illustrated embodiment to control roll and pitch. FIG. 6 provides a cross-sectional view of the actuation apparatus 100 taken along the 6—6 line in FIG. 1, illustrating one particular construction of the gear assemblies 124b, 124c, which are used in the illustrated embodiment to control roll and yaw.

Referring to FIG. 5–FIG. 6, each of the gear assemblies 124a–124d includes a first screw 136a–136d fixedly attached at one end to the trust bar 118a–118d, respectively. In the illustrated embodiment, the first screws 136a–136d are threadedly engaged with the thrust bars 118a–118d. Second ends of the first screws 136a–136d are received in bores 138a–138d defined by second screws 140a–140d. Each of the gear assemblies 124a–124d also includes a thrust nut 142a–142d threadedly engaged with the first screw 136a–136d and fixedly attached to the roll gear 130a–130d that meshes with, and is driven by, the roll spur gear 104a, as discussed above. Bearings 144a–144d are disposed between the roll gears 130a–130d and the second screws 140a–140d and allows the roll gears 130a–130d and the second screws 140a–140d to rotate with respect to one another, as will be more fully described later. The second screws 140a–140d are supported by the housing 102 via the bearings 126a–126d, such that the second screws 140a–140d can rotate with respect to the housing 102.

Referring now to FIG. 5, the pitch gears 132a, 132c of the gear assemblies 124a, 124c are fixedly mounted to the second screws 140a, 140c. Translation nuts 146a, 146c engage the second screws 140a, 140c such that, as the second screws 140a, 140c are rotated by the pitch gears 132a, 132c, the translation nuts 146a, 146c translate along the second screws 140a, 140c.

As depicted in FIG. 6, the yaw gears 134b, 134d of the gear assemblies 124b, 124d are fixedly mounted to the second screws 140b, 140d. As in the gear assemblies 124a, 124c of FIG. 5, translation nuts 146b, 146d engage the second screws 140b, 140d such that, as the second screws 140*b*, 140*d* are rotated by the yaw gears 134*b*, 134*d*, the translation nuts 146*b*, 146*d* translate along the second screws 140*b*, 140*d*. In one embodiment, one or more of the second screws 140*a*–140*d* are ball screws and a corresponding one or more of the translation nuts 146*a*–146*d* are ball nuts.

As presented above, each of the gear assemblies 124*a*–124*d* are mechanically coupled with a corresponding output shaft 128*a*–128*d*. The output shafts 128*a*–128*d* are attached to the control surfaces 804 (shown in FIG. 8). FIG. 7 provides a perspective view of a portion of the actuation apparatus 100 with some elements removed for clarity in illustrating one particular mechanical coupling between the gear assembly 124*d* and the output shaft 128*d*. While the mechanical coupling between the gear assembly 124*d* and the output shaft 128*d* is particularly illustrated in FIG. 7, mechanical couplings between each of the gear assemblies 124*a*–124*d* and the corresponding output shafts 128*a*–128*d* are effected in the same manner. Accordingly, while the following description addresses the mechanical coupling between the gear assembly 124*d* and the corresponding output shaft 128*d*, the description applies, in at least one embodiment, to the mechanical couplings between the gear assemblies 124*a*–124*c* and the corresponding output shafts 128*a*–128*c*.

In the illustrated embodiment, the translation nut 146*d* includes a clevis 148*d* that is coupled with a clevis 150*d* of the output shaft 128*d* by a linkage 152*d* and pins 154. In the illustrated example, as the yaw drive assembly 110*c* rotates the yaw spur gear 104*c*, the second screw 140*d* is rotated, which translates the translation nut 146*d* a distance along the length of the second screw 140*d*. The pins 154 and the linkage 152*d* transmit the translation of the translation nut 146*d* to the output shaft 128*d*, causing the output shaft 128*d*, and thus one of the control surfaces 804 (shown in FIG. 8), to rotate. Rotation of a pair of opposed control surfaces 804 effects a change in yaw of the vehicle.

To effect a change in roll of the vehicle, a pair of opposed control surfaces 804 are rotated in opposite directions with respect to a vehicle datum, while the other pair of opposed control surfaces 804 are rotated in opposite directions with respect to the vehicle datum. Thus, referring to FIG. 5–FIG. 6, the thread direction of the first screws 136*a*, 136*b* and the thrust nuts 142*a*, 142*b* is opposite that of the first screws 136*c*, 136*d* and the thrust nuts 142*c*, 142*d*. In other words, if the first screws 136*a*, 136*b* and the thrust nuts 142*a*, 142*b* comprise right-handed threads, the first screws 136*c*, 136*d* and the thrust nuts 142*c*, 142*d* comprise left-handed threads.

In a roll-changing maneuver, the roll drive assembly 110*a* rotates the roll spur gear 104*a*, which, in turn, rotates the thrust nut 142*d*. As shown in FIG. 6, the thrust nut 142*d* is mechanically coupled with an outer ring 156*d* of the bearing 144*d*. As the thrust nut 142*d* is rotated, it translates a distance along the length of the first screw 136*d*, which correspondingly translates the second screw 140*d*. However, the thrust nut 142*d* does not rotate the second screw 140*d* due to the bearing 144*d* disposed therebetween. The translation nut 146*d* translates a corresponding distance along with the second screw 140*d*. The pins 154 and the linkage 152*d* transmit the translation of the translation nut 146*d* and the second screw 140*d* to the output shaft 128*d*, causing the output shaft 128*d*, and thus the control surface 804, to rotate.

In the illustrated embodiment, the gear assemblies 124*a*–124*c* operate in the same fashion as described above regarding the gear assembly 124*d*, except that the gear assemblies 124*a*, 124*c* include the pitch gears 132*a*, 132*c*, which are engaged with the pitch spur gear 104*b*, rather than the yaw gears 134*b*, 134*d*. Note that the roll gears 130*a*–130*d*, the pitch gears 132*a*, 132*c*, and the yaw gears 134*b*, 134*d* are wider than their corresponding spur gears (i.e., the spur gears 104*a*–104*c*, respectively) to accommodate translation of the roll gears 130*a*–130*d*, the pitch gears 132*a*, 132*c*, and the yaw gears 134*b*, 134*d* with respect to the spur gears 104*a*–104*c*. For example, as the roll gears 130*a*, 130*c* are actuated by the roll spur gear 104*a*, the thrust nuts 142*a*, 142*c* translate the roll gears 130*a*, 130*c* with respect to the roll spur gear 104*a* and translate the pitch gears 132*a*, 132*c* with respect to the pitch spur gear 104*b*. Accordingly, the roll gears 130*a*–130*d*, the pitch gears 132*a*, 132*c*, and the yaw gears 134*b*, 134*d* have widths that accommodate such translations.

In some situations, it may be desirable to only control roll and pitch or roll and yaw. For example, in some embodiments of the present invention, the yaw spur gear 104*c*, the yaw drive assembly 110*c*, and the gear assemblies 124*b*, 124*d* may be omitted, such that only roll and pitch are controlled. In other embodiments, the pitch spur gear 104*b*, the pitch drive assembly 110*b*, and the gear assemblies 124*a*, 124*c* may be omitted, such that only roll and yaw are controlled. Thus, the scope of the present invention encompasses embodiments wherein only some of roll, pitch, and yaw are controlled.

Thus, the actuation apparatus 100 can be used to mechanically combine two inputs (e.g., the desired changes in roll and pitch, or the desired changes in roll and yaw) into a single mechanical output to the control surface 804. The actuation apparatus 100 is, by way of example and illustration, but one means for mechanically combining two inputs (e.g., the desired changes in roll and pitch, or the desired changes in roll and yaw) into a single mechanical output to the control surface 804.

It may be desirable in some situations, such as when initially assembling the actuation apparatus 100, to individually adjust one or more of the gear assemblies 124*a*–124*d* such that the corresponding one or more control surfaces 800 are aligned or oriented in a particular manner. Such an adjustment may be accomplished by rotating one or more of the first screws 136*a*–136*d* with respect to their corresponding thrust bars 118*a*–118*d*. In the illustrated embodiment, ends of the first screws 136*a*–136*d* each define a socket (proximate the 136*a*–136*d* label lead line ends in FIG. 1), which can be engaged with a tool to rotate the first screws 136*a*–136*d* with respect to their corresponding thrust bars 118*a*–118*d*.

Figure 8:
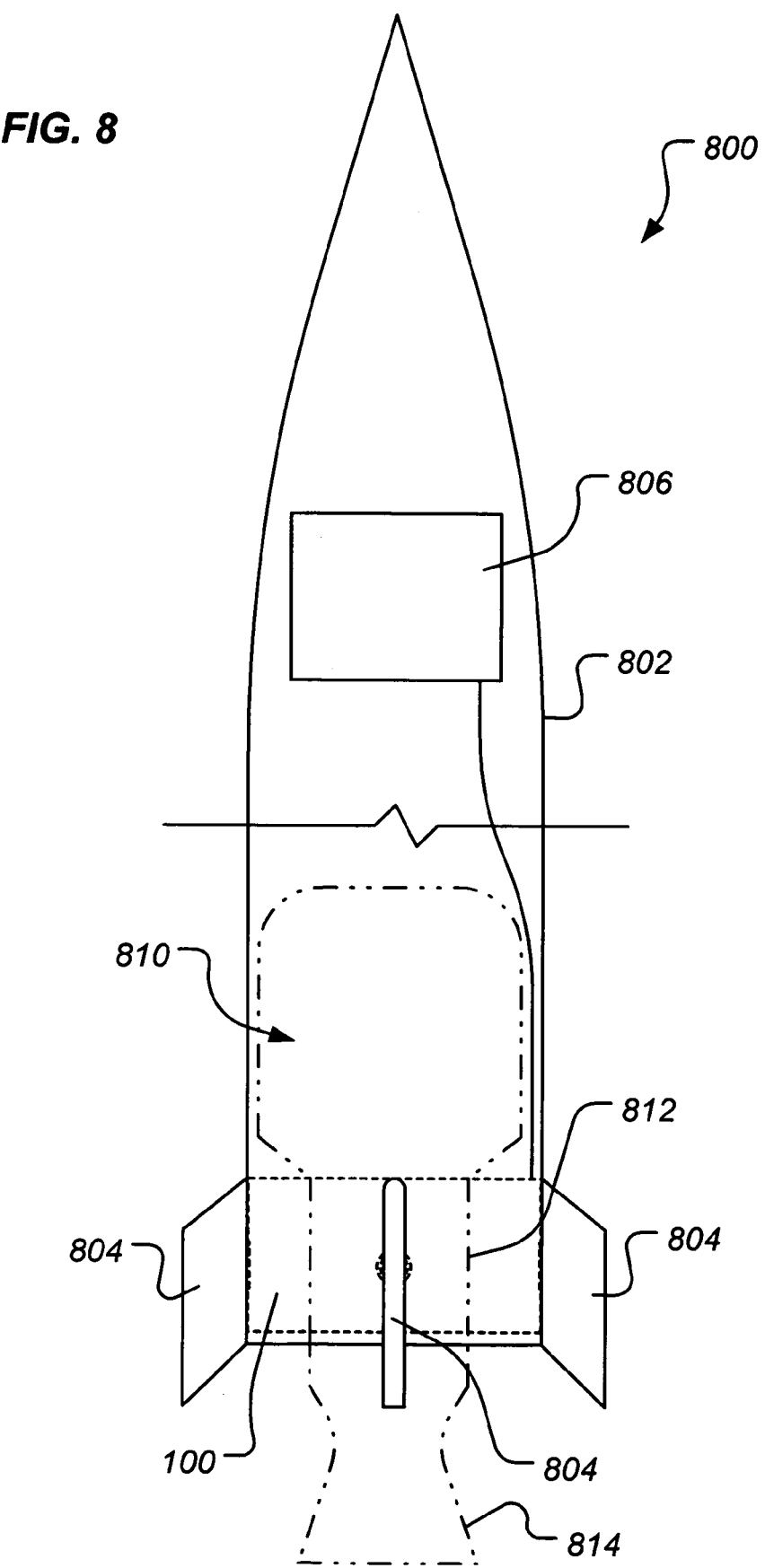
FIG. 8 is a stylized, side view of a vehicle incorporating the actuation apparatus of FIG. 1.

FIG. 8 depicts an illustrative application for the actuation apparatus 100, in which the actuation apparatus 100 forms part of a projectile 800. In this embodiment, the actuation apparatus is disposed within a body 802 of the vehicle 800 and the control surfaces 804 are attached to the output shafts 128*a*–128*d*, respectively, of the actuation apparatus 100. In operation, the desired attitude (i.e., the roll, pitch, and yaw) of the vehicle with respect to a datum is provided by, for example, a guidance or trajectory controller 806 within the body 802 of the projectile 800 to an actuation controller 158 (shown best in FIG. 4). The actuation controller 158, in turn, provides commands to the drive assemblies 110*a*–110*c* to effect articulation of the control surfaces 804.

In the illustrated embodiment, the projectile 800 comprises a rocket motor 810 (shown in phantom) that includes a blast tube 812. Generally, blast tubes (e.g., the blast tube 812) carry combustion products resulting from ignited propellant to the motor's nozzle (e.g., a nozzle 814). While not required, some embodiments of the present invention may utilize the blast tube 812 as the central tube 106 (shown in FIG. 1–FIG. 6).

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus for actuating a control surface, comprising:
    a first spur gear;
    a first drive assembly engaged with the first spur gear;
    a second spur gear;
    a second drive assembly engaged with the second spur gear; and
    a gear assembly mechanically capable of being coupled with the control surface and engaged with the spur gears, the gear assembly comprising:
        a first screw;
        a first gear engaged with the first spur gear;
        a thrust nut mounted to the first gear and threadedly engaged with the first screw;
        a second gear engaged with the second spur gear;
        a second screw mounted to the second gear and mechanically coupled with the thrust nut such that the second screw and the thrust nut rotate independently and translations of the thrust nut are transmitted to the second screw; and
        a translation nut threadedly engaged with the second screw and capable of being mechanically coupled with the control surface.

2. An apparatus, according to claim 1, wherein at least one of the drive assemblies further comprises:
    a motor;
    a speed reducer mounted to the motor and having an output shaft; and
    a drive gear mounted to the output shaft and engaged with one of the spur gears.

3. An apparatus, according to claim 1, wherein:
    the translation nut comprises a clevis; and
    the apparatus further comprises a linkage mechanically coupled with the clevis and capable of being coupled with a clevis of a control surface shaft.

4. An apparatus, according to claim 1, wherein the first screw is adapted for adjusting the gear assembly.

5. An apparatus, according to claim 1, wherein the first spur gear comprises a roll spur gear and the second spur gear comprises one of a pitch spur gear and a yaw spur gear.

6. An apparatus, according to claim 1, wherein:
    the translation nut comprises a clevis; and
    the apparatus further comprises a linkage mechanically coupled with the clevis and capable of being coupled with a clevis of a control surface shaft.

7. An apparatus, according to claim 1, further comprising an actuation controller coupled with the drive assemblies, such that actuation commands may be transmitted from the actuation controller to the drive assemblies.

8. An apparatus, according to claim 1, further comprising a central tube and a bearing disposed between each of the spur gears and the central tube.

9. An apparatus, according to claim 8, wherein the central tube comprises a blast tube.

10. An apparatus, according to claim 2, further comprising a housing and a thrust bar mounted to the housing and to the central tube, such that one end of the gear assembly is mounted to the thrust bar.

11. An apparatus, according to claim 1, further comprising:
    a third spur gear;
    a third drive assembly engaged with the third spur gear; and
    a second gear assembly mechanically coupled with a second control surface and engaged with the first spur gear and the third spur gear.

12. An apparatus, according to claim 11, wherein the first spur gear is a roll spur gear, the second spur gear is a pitch spur gear, and the third spur gear is a yaw spur gear.

13. An apparatus, according to claim 11, further comprising an actuation controller coupled with the drive assemblies, such that actuation commands may be transmitted from the actuation controller to the drive assemblies.

14. A vehicle, comprising:
    a control surface; and
    an apparatus for actuating the control surface, comprising:
        a first spur gear;
        a first drive assembly engaged with the first spur gear;
        a second spur gear;
        a second drive assembly engaged with the second spur gear; and
        a gear assembly mechanically coupled with the control surface and engaged with the spur gears, the gear assembly comprising:
            a first screw;
            a first gear engaged with the first spur gear;
            a thrust nut mounted to the first gear and threadedly engaged with the first screw;
            a second gear engaged with the second spur gear;
            a second screw mounted to the second gear and mechanically coupled with the thrust nut such that the second screw and the thrust nut rotate independently and translations of the thrust nut are transmitted to the second screw; and
            a translation nut threadedly engaged with the second screw and capable of being mechanically coupled with the control surface.

15. A vehicle, according to claim 14, wherein at least one of the drive assemblies further comprises:
    a motor
    a speed reducer mounted to the motor and having an output shaft; and
    a drive gear mounted to the output shaft and engaged with one of the spur gears.

16. A vehicle, according to claim 14, wherein:
    the translation nut comprises a first clevis;
    the control surface comprises a shaft including a second clevis; and
    the apparatus further comprises a linkage mechanically coupling first clevis and the second clevis.

17. A vehicle, according to claim 14, wherein the first screw is adapted for adjusting the gear assembly.

18. A vehicle, according to claim 14, wherein the first spur gear comprises a roll spur gear and the second spur gear comprises one of a pitch spur gear and a yaw spur gear.

19. A vehicle, according to claim 14, wherein:
the control surface comprises a shaft including a first clevis;
the gear assembly comprises a second clevis; and
the apparatus further comprises a linkage coupling the first clevis and the second clevis.

20. A vehicle, according to claim 14, further comprising an actuation controller coupled with the drive assemblies, such that actuation commands may be transmitted from the actuation controller to the drive assemblies.

21. A vehicle, according to claim 14, further comprising a central tube and a bearing disposed between each of the spur gears and the central tube.

22. A vehicle, according to claim 21, wherein the central tube comprises a blast tube.

23. A vehicle, according to claim 21, further comprising a housing and a thrust bar mounted to the housing and to the central tube, such that one end of the gear assembly is mounted to the thrust bar.

24. A vehicle, according to claim 14, further comprising:
a third spur gear;
a third drive assembly engaged with the third spur gear; and
a second gear assembly mechanically coupled with a second control surface and engaged with the first spur gear and the third spur gear.

25. A vehicle, according to claim 24, further comprising an actuation controller coupled with the drive assemblies, such that actuation commands may be transmitted from the actuation controller to the drive assemblies.

26. A vehicle, according to claim 24, wherein the first spur gear is a roll spur gear, the second spur gear is a pitch spur gear, and the third spur gear is a yaw spur gear.

27. A method for actuating a control surface, comprising the steps of:
actuating a first drive assembly and a second drive assembly;
rotating a first spur gear with the first drive assembly;
rotating a first gear with the first spur gear;
translating a thrust nut along a first screw with the first gear; and
transmitting the translation of the thrust nut to a second screw, such that the second screw and the thrust nut rotate independently; and
rotating a second spur gear with the second drive assembly;
rotating a second gear with the second spur gear;
rotating a second screw with the second gear; and
moving a translation nut with the second screw to actuate the control surface.

\* \* \* \* \*

UNITED STATES PATENT AND TRADEMARK OFFICE
CERTIFICATE OF CORRECTION

| | | |
|---|---|---|
| PATENT NO. | : 7,219,579 B2 | Page 1 of 1 |
| APPLICATION NO. | : 10/797489 | |
| DATED | : May 22, 2007 | |
| INVENTOR(S) | : Mark A. Turner | |

It is certified that error appears in the above-identified patent and that said Letters Patent is hereby corrected as shown below:

In column 8, line 6, cancel the text beginning with "10. An apparatus," to and ending with "thrust bar." in column 8, line 9, and insert the following claim:

--10. An apparatus, according to claim 8, further comprising a housing and a thrust bar mounted to the housing and to the central tube, such that one end of the gear assembly is mounted to the thrust bar.--

Signed and Sealed this

Tenth Day of July, 2007

JON W. DUDAS
*Director of the United States Patent and Trademark Office*